United States Patent [19]

Baus

[11] Patent Number: 4,611,947
[45] Date of Patent: Sep. 16, 1986

[54] COUPLING ASSEMBLY FOR JOINING TWO PROFILED RAILS

[76] Inventor: Heinz G. Baus, 35 Wartbodenstrasse, CH-3626 Hünibach-Thun, Switzerland

[21] Appl. No.: 585,999

[22] Filed: Mar. 5, 1984

[30] Foreign Application Priority Data

Mar. 19, 1983 [DE] Fed. Rep. of Germany ....... 3310005

[51] Int. Cl.⁴ .......................... F16B 7/00; F16D 1/12
[52] U.S. Cl. .................................. 403/104; 403/109; 403/205; 403/378; 403/364; 403/403; 52/217; 52/213; 49/505
[58] Field of Search ............... 403/104, 109, 373, 387, 403/16, 11, 403, 205, 255, 364, 83, 377, 405; 49/505, 504; 52/217, 213, 214

[56] References Cited

U.S. PATENT DOCUMENTS

| | | | |
|---|---|---|---|
| 1,848,045 | 3/1932 | Campbell | 52/213 |
| 2,256,548 | 9/1941 | Chaffee | 52/217 |
| 2,742,117 | 4/1956 | Tolman | 49/505 X |
| 2,768,410 | 10/1956 | Woodard | 52/217 |
| 2,923,351 | 2/1960 | Zitomer | 49/505 |
| 3,018,861 | 1/1962 | Somville | 52/217 X |
| 3,222,095 | 12/1965 | Gerus | 403/104 |
| 4,021,129 | 5/1977 | Sykes | 403/252 |
| 4,048,059 | 9/1977 | Evans | 403/405 X |
| 4,372,082 | 2/1983 | Pagel | 49/505 X |
| 4,438,597 | 3/1984 | Maggart | 49/504 |
| 4,453,346 | 6/1984 | Powell et al. | 49/505 |

FOREIGN PATENT DOCUMENTS

| | | |
|---|---|---|
| 0011992 | 6/1980 | European Pat. Off. . |
| 1654766 | 5/1972 | Fed. Rep. of Germany . |
| 2556396 | 6/1976 | Fed. Rep. of Germany . |
| 2812502 | 9/1979 | Fed. Rep. of Germany . |
| 2273966 | 1/1976 | France . |

Primary Examiner—Cornelius J. Husar
Assistant Examiner—Todd G. Williams
Attorney, Agent, or Firm—Schwartz, Jeffery, Schwaab, Mack, Blumenthal & Evans

[57] ABSTRACT

Coupling assembly joining two profiled rails, more particularly for use with a shower partition, the first profiled rail having an opening extending over its entire length and an inner space. A clamping element is mounted in this inner space and has a threaded hole in which a screw threads, the second profiled rail being secured to the first profiled rail by tightening of the said screw. In order to facilitate assembly and make it possible to carry out subsequent mutual alignment of the profiled rails with little effort, there is provided that the clamping element be insertable from the side and at right angles to the longitudinal direction of the first profiled rail through the above-mentioned opening and into the inner space, one leg of the second profiled rail passing through the opening into the inner space. This leg is clamped in a gap which is formed between a bearing surface of the clamping element and a web of the first profiled rail and/or a support element.

7 Claims, 11 Drawing Figures

COUPLING ASSEMBLY FOR JOINING TWO PROFILED RAILS

BACKGROUND OF THE INVENTION

The present invention relates to an assembly for joining two profiled rails, more particularly of a shower partition; the first profiled rail having an opening extending essentially over its entire length and an inner space or chamber. Mounted in this inner chamber is a clamping element having a threaded hole into which a screw is threaded, the second profiled rail being adapted to be secured, in relation to the first profiled rail, by tightening the screw.

U.S. Pat. No. 4,021,129 describes an assembly for joining profiled rails in which the inner chamber and the opening, extending in the longitudinal direction in the first profiled rail, form an undercut longitudinal groove. The clamping element must be inserted into the longitudinal groove from an end face of the profiled rail. An angle piece is connected to the second profiled rail by means of screws and is mounted in a cavity therein. The clamping element and angle piece are connected together by means of screws. The outer surfaces of the profiled rails are butted together. Production of this joint requires a considerable amount of labour, since the individual components must be assembled consecutively and bolted together. Subsequent alignment of the profiled rails requires considerable effort since the whole assembly must first be practically dismantled.

German OS No. 2,556,396 describes a joint fitting for furniture which is in the form of a hollow body comprising chambers for the accommodation of nuts for bolts, the joint fitting being made in two parts and the nuts being placed in the chambers prior to assembly. The parts to be coupled by means of the joint fitting are provided with recesses into which the bolts are inserted. Both the joint fitting and the pieces of furniture comprise matching holes for the bolts. The pieces of furniture and the joint fitting are in specific alignment with each other, which makes subsequent alteration or adjustment impossible.

German OS No. 1,654,766 describes a frame or box skeleton the sections of which are coupled by means of separate angle pieces, bolts, nuts and clamping elements. The angle pieces and sections have matching holes through which the bolts are passed. Once the holes have been made in the sections, subsequent movement or alignment thereof is possible only if new holes are made.

Where profiled rails are to be coupled, there is a greater demand today than heretofore for simple and functional handling. This applies in particular to so-called extension or compensating sections which must be provided to compensate for tolerances arising at the construction site when a component is incorporated, for example a shower partition, a window frame or a door frame. It was hitherto considered sufficient to drill a hole subsequently in one of the profiled rails to be joined, at the required location, and then to use a bolt or the like to make the joint. In practice, this raises problems, some of them major, since drilling, sawing, filling etc., during assembly, are costly and time-consuming. Moreover, incorrect drilling, or the slipping of a drill, may damage the profiled rail as a whole, and the best position is often found by the assembler only after several tests, and this creates considerable additional work.

SUMMARY OF THE INVENTION

It is therefore an object of the invention to propose a low-cost assembly of this kind which provides a rapid and reliable joint or coupling between two profiled rails, the mutual alignment thereof being initially variable. The coupling is easy to make without additional tools and especially without cutting tools, but still ensures a functional and permanent joint between the rails. When required, it is possible to align the profiled rails, as desired, in relation to each other, to alter the geometrical position thereof and, thereafter, to unite them firmly together. The assembly meets high safety requirements and operational requirements and conditions. Handling and assembly of the rails is also facilitated.

In order to accomplish this object, it is proposed that the clamping element be inserted, from the side, preferably at right angles to the longitudinal direction of the first profiled rail, through the opening into the inner chamber, one leg of the second profiled rail passing through the opening into the inner chamber of the first profiled rail, the said leg being clamped in a gap located between a bearing surface on the clamping element and a clamping surface on a web on the first profiled rail and/or on a support element.

The assembly according to the invention provides a rapid but reliable joint between two profiled rails in a particularly simple and inexpensive manner. By means of the clamping element according to the invention, the leg of the second profiled rail may be secured in relation to the web of the first profiled rail. Geometrical alignment of the two profiled rails in relation to each other may be varied to a greater or lesser degree by pushing the said leg more or less deeply into the gap, and the relevant edge conditions may be predetermined accordingly. This is highly significant, above all in connection with so-called extension and compensating profiled rails, especially since no metal removing processing of the profiled rails need be carried out at the construction site. The coupling is prepared at the manufacturer's plant. Assembly merely requires the two profiled rails to be inserted one into the other in the necessary manner, and to be aligned, whereupon the coupling is completed merely by tightening the screws. What is significant in this connection is that the profiled rails may first be provisionally aligned and assembly with no metal removing processing. Provisional locking and alignment is obtained by first tightening the screws, as a rule not too much. If necessary, this alignment may be altered by loosening the screws, after which the joint is locked in its final position by fully tightening the screws. According to the invention, the surface of the clamping element is large enough to prevent damage to the profiled rails. In order to facilitate assembly, the profiled rails are designed in such a manner that the leg of the second rail is adapted to be inserted from the side into the first profiled rail, the depth of insertion being predeterminable. If, for example, a rail is to be arranged vertically, the second profiled rail must be inserted into the first rail horizontally from the side, and this is easily accomplished even in cramped conditions. The depth of insertion may be predetermined as required, especially in order to compensate for inaccuracies at the construction site.

In one particular case, the leg of the second profiled rail comprises a slot running at least approximately at right angles to the longitudinal axis. The screw and/or the clamping element passes through this slot. This makes it possible to insert the second profiled rail into the first profiled rail, as required, and this movement is not restricted in any way by the screw or clamping element. According to the invention, the clamping element fits over this slot and must therefore absorb tensile or compressive forces.

The clamping element in particular, may be made of a glass fibre reinforced synthetic material in which the nut or threaded sleeve is embedded during production, more particularly by an injection-moulding process. The nut or threaded sleeve is integral with the clamping element which can be made of the required shape at low cost. The clamping element, the threaded sleeve and/or the internal thread may be made of the same material and in one piece. This applies both to a synthetic and to any other material, especially metal. The clamping element may also be a metal die-cast part incorporating the internal thread. From the point of view of production costs, however, the embedded threaded sleeve is the most satisfactory.

The clamping element may be substantially in the form of a plate and the surface thereof remote from the web of the profiled rail comprise a projection and/or stiffening ribs for the threaded sleeve. This provides a functional, space and weight saving clamping element using very little material.

According to a variant, the assembly comprises an extension facing the web of the profiled rail, the said extension passing through the support element and containing the threaded sleeve and/or the internal thread. In this variant, because of the intervening support element, the clamping gap is arranged at a predetermined distance. The leg of the second profiled rail is thus braced or clamped immediately over the support element, in relation to the first profiled rail. The width of the support element may be as required.

In order to secure the support element, on the one hand, and a first profiled rail on the other hand, simply and reliably to a wall or to another profiled rail, the said support element comprises a transverse hole which is in alignment with a hole in the web of the first profiled rail, and through which an attachment bolt may be passed. Thus the necessary arrangements are made, during production of the profiled rail and of the support element, to allow assembly and attachment of the profield rail to be effected merely by passing the attachment bolt through the said transverse hole and through the said hole in the web, thus eliminating any processing during assembly.

In one particularly practical embodiment, the support element is equipped with an internally threaded hole accommodating an adjusting screw for a frame section or the like. The said adjusting screw engages in known fashion with the said frame section or the like. The distance from the first frame section may easily be varied and adjusted by rotating the said adjusting screw.

In another particular embodiment, the distance between the outer and inner surfaces of the two webs of the first profiled rail, upon which the legs bear, is equal to that between the corresponding bearing surfaces of the legs of the second profiled rail. In contrast to known constructions, in which the legs engage over the outside of the webs, or vice-versa, the said legs and webs are in staggered engagement with each other. In a surprisingly simple manner, this provides a large number of possible variations in the further construction of the two profiled rails.

In order to facilitate rapid and simple assembly, one lateral surface of the clamping element bears against the first profiled rail, thus preventing rotation. On the one hand, this prevents the clamping element from becoming loose and falling out of the interior, during transportation, for example. On the other hand, it prevents the clamping element from rotating when the bolt is tightened. Moreover it eliminates the need for tools to hold the clamping element during assembly.

BRIEF DESCRIPTION OF THE DRAWINGS

The invention will be better understood by means of the description of embodiments thereof illustrated in the drawing attached hereto, wherein.

DETAILED DESCRIPTION OF PREFERRED EMBODIMENTS

Figure 1:
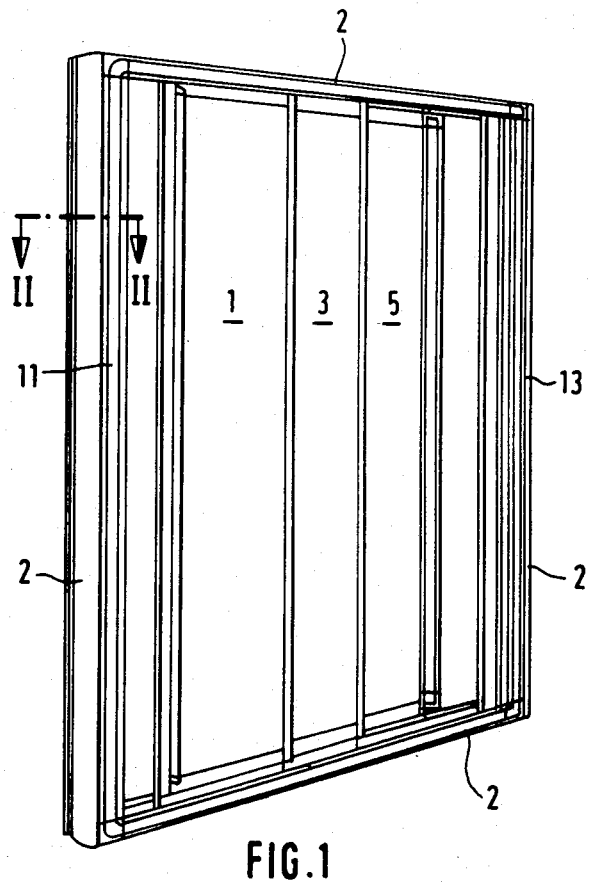
FIG. 1 is a perspective view of a shower-partition.

FIG. 1 is a diagrammatic representation of a shower partition, the frame of which consists of four profiled rails arranged at right angles.

Door panels 1, 3, 5, horizontally displaceable, are mounted in an upper horizontal profiled rail 2. The partition is generally disposed with its lower horizontal profiled rail 2 on the edge of a shower tub, while the two vertical profiled rails are attached to the wall of a room, or additional partitions are attached to them. Outer surfaces 13 of profiled rails 2, visible externally to an observer, in this case from the right-hand side, are equipped with facing profiles 11. Subsequently connected to first profiled rails 2 are second profiled rails, to be described hereinafter, in the form of extension, compensating or connecting profiles.

Figure 2:
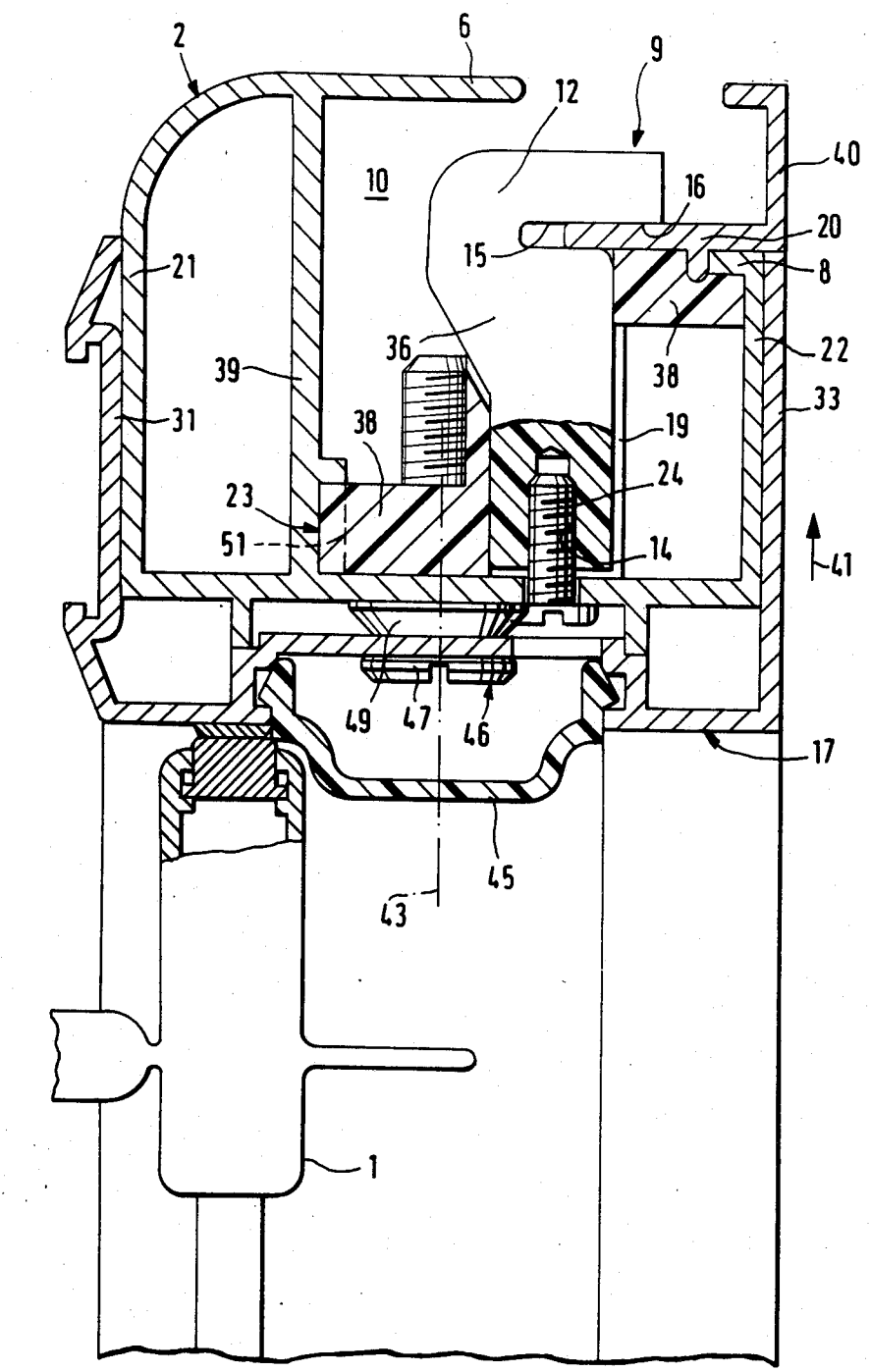
FIG. 2 is a cross-section through the vertical profiled rails, according to FIG. 1, along line II—II.

FIG. 2 is a cross-section through a vertically-arranged first profiled rail 2, to which a second profiled rail 40 is attached. The first rail 2 contains two parallel webs 6, 8 between which an opening 9 is formed. Also provided is an inner space 10 which, like the said opening, runs at right angles to the plane of the drawing, over the length of profiled rail 2. Mounted in inner space 10 is a clamping element 12 having a threaded hole 14 and a bearing surface 15. Also located in inner space 10 is a support element 38, a gap 16 being provided between the latter and bearing surface 15. A leg 20 of second profiled rail 40 engages in the said gap. A screw 24 passes through a hole in first profiled rail 2 and is screwed into threaded hole 14 of clamping element 12. When screw 24 is tightened, leg 20 of second profiled rail 40 is clamped between clamping element 12 and support element 38. Threaded hole 14 is located in an extension 36 of clamping element 12, the said extension being inserted into a recess 19 in the support element 38. Profiled rail 2 is mounted in a frame section 17. An adjusting screw 46 comprises two flange-like extensions 47, 49. Screw 46 is inserted into a slot, not shown, in frame section 17, in such a manner that extensions 47, 49 lock the said screw in the axial direction. The thread of screw 46, also not shown, engages in an internal thread in support element 38, in such a manner that first profiled rail 2 may be adjusted in the direction of arrow 41 by rotating the said screw. Legs 21, 22 of first profiled rail 2 lie between legs 31, 33 of frame section 17, so that satisfactory guidance and stable alignment are obtained. One lateral surface 23 of support element 38 bears against a central web 39 of first profiled rail 2. Rotation of support element 38, and thus of clamping element 12 also, is reliably prevented. A plastic cover strip 45 is provided in frame section 17 in the vicinity of screw 46.

Figure 3:
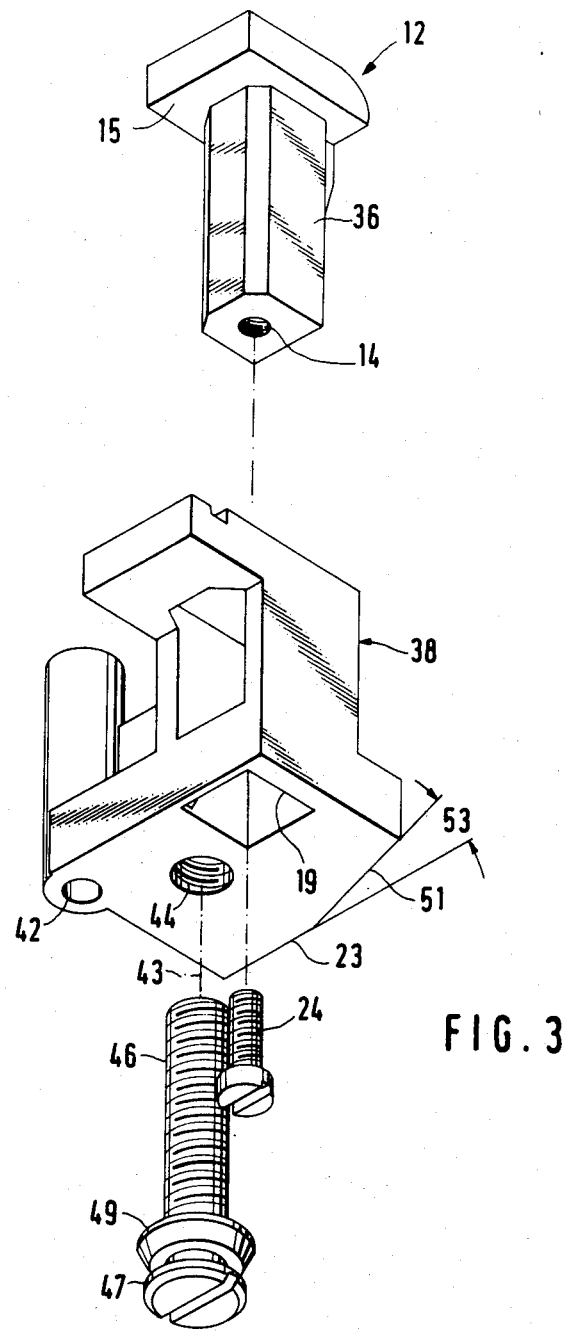
FIG. 3 is a perspective representation of a modified clamping element and a support element used to join the profiled rails according to FIG. 2.

FIG. 3 is a perspective exploded view of clamping element 12 and support element 38. Visible in the latter is a rectangular recess 19 for extension 36 of the said clamping element 12. A threaded hole 14 is provided for screw 24. Support element 38 is also internally threaded at 44 for screw 46 with its flanges 47, 49 by means of which the said screw 46 is axially positioned in the above-mentioned frame section 17. Support element 38 also has a transverse wall 51 making an angle 53 with lateral surface 23. This angle facilitates, in a simple manner, the insertion of support element 38 into inner space 10. Finally, the support element 38 also has a transverse hole 42, the purpose of which will be explained hereinafter.

Figure 4:
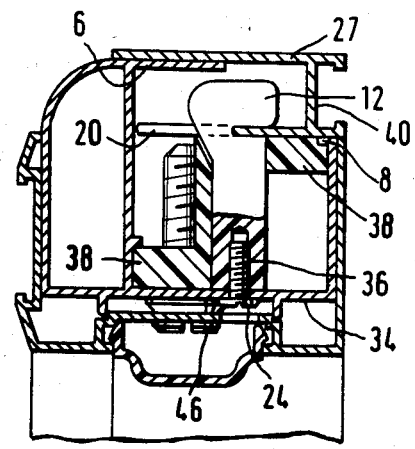
FIG. 4 is a cross-section, similar to that in FIG. 2, but with a modified second profiled rail.

In FIG. 4, clamping element 12 is shown in inner space 10 of first profiled rail 34. Mounted within rail 36 is support element 38, through which extension 36 passes. Legs 20, 27 of second profiled rail 40 lie upon webs 6, 8 of first profiled rail 34. In this case, second profiled rail 40 is approximately U-shaped, leg 20, comprising a slot, being supported by clamping element 12, indirectly, through support element 38, upon first profiled rail 34.

It will be seen that second profiled rail 40 can, in this case, be withdrawn from the first profiled rail to the right in the drawing, as soon as screw 24 is loosened. Conversely, the first profiled rail, prefabricated and prepared in the plant, may easily be connected, during assembly, to second profiled rail 40 which is then to be inserted.

Figure 5:
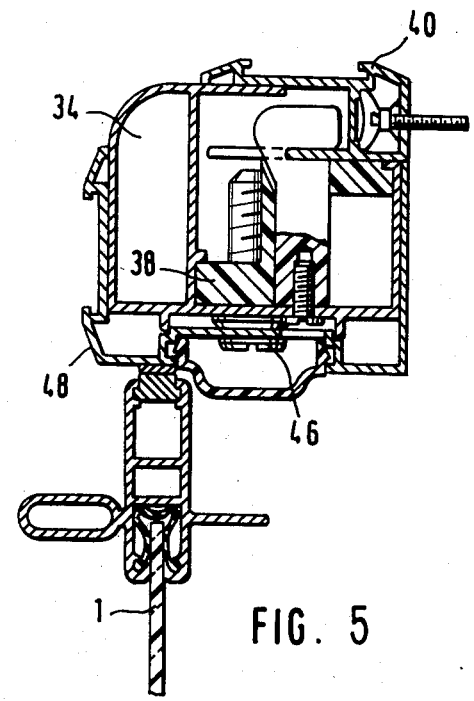
FIG. 5 is a cross-section of an embodiment similar to that in FIG. 4, but with a second profiled rail designed for a side wall.

FIG. 5, there is shown second profiled rail 40 in the form of the frame section of a lateral wall connected to first profiled rail 34. As indicated by the dotted lines, second profiled rail 40 can be moved to the right and may thus be adjusted to the desired position in relation to the first profiled rail 34. Screwed into support element 38 is an adjusting screw 46 which is used for the attachment of a further frame section 48, the said frame section being part of the frame, not shown, of a shower partition, the sliding door of which is marked 1.

Figure 6:
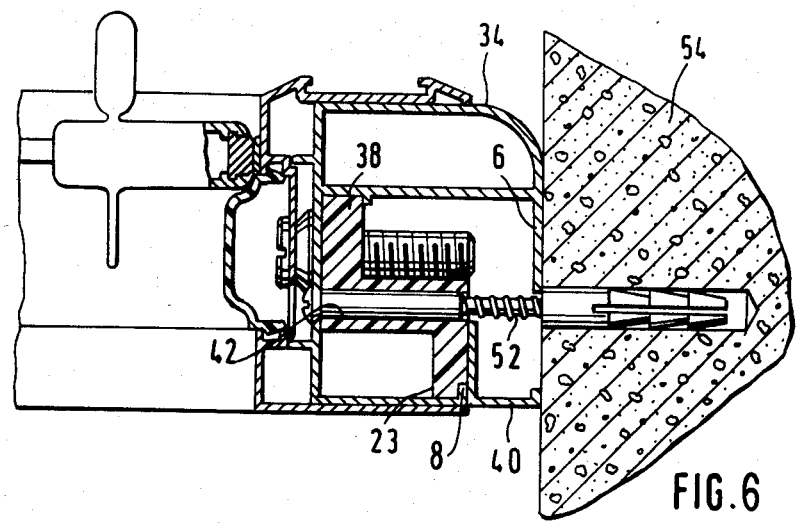
FIG. 6 is a cross-section of an embodiment according to FIG. 4 secured to the wall of a room.

The embodiment shown in FIG. 6 corresponds substantially to that described in conjunction with FIGS. 2 through 4, less the clamping element 12. First profiled rail 34 is screwed to wall 54 of a room by means of an attachment screw 52 which passes through previously-mentioned transverse hole 42 in support element 38 and also through a matching hole in profiled rail 34. Profiled rail 34 is supported with respect to wall 54 by means of L-shaped profiled rail 40 and also by web 8.

Figure 7:
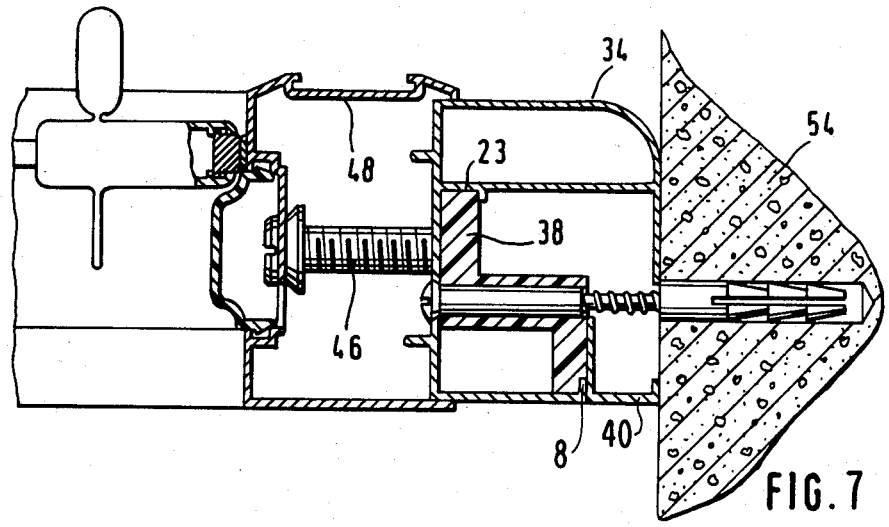
FIG. 7 is a cross-section of an embodiment according to FIG. 6, with the frame section arranged at a predetermined distance from the first profiled rail by means of an adjusting screw.

According to FIG. 7, frame section 48 is adjusted, by means of adjusting screw 46, at a greater distance in relation to first profiled rail 34, and thus also in relation to wall 54 of the room, than in FIG. 6. It is again pointed out that support element 38 comprises a hole 44, not shown, comprising an internal thread for adjusting screw 46. The desired distance between frame section 48 and wall 54 may be predetermined by suitable rotation of adjusting screw 46.

Figure 8:
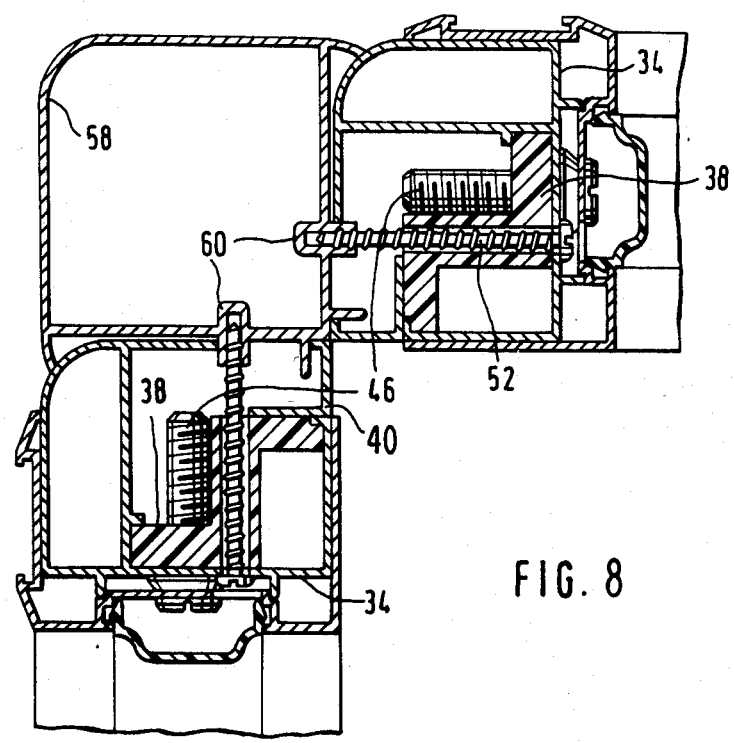
FIG. 8 is a cross-section showing a combination of two embodiments similar to FIG. 6.

FIG. 8 represents a combination of two embodiments similar to FIG. 6 and a common connecting profile 58. The latter has two screw-channels 60 in which attachment screws 52 engage, the said screws being guided by relevant profiled rails 34 and their support elements 38.

Figure 9:
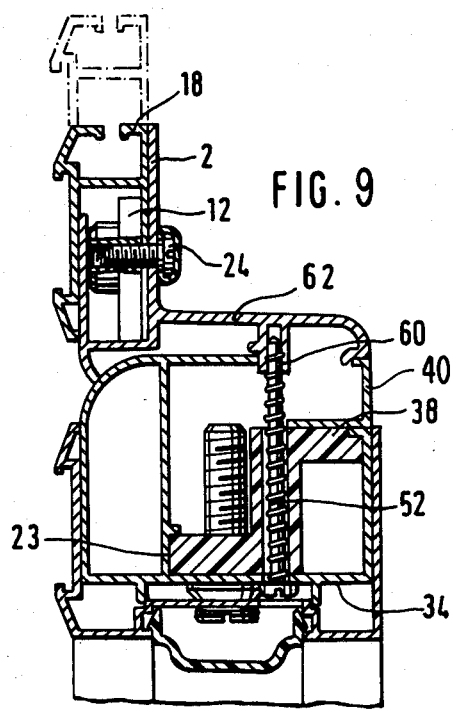
FIG. 9 is a cross-section showing a combination of profiled rails in which use is made of a plate-like clamping element and also of a clamping element in conjunction with a support element.

According to FIG. 9, one embodiment of first profiled rail 2 is connected to a further embodiment of profiled rail 34. In this case, first profiled rail 2 comprises an extension 62 with a screw channel 60 for attachment screw 52 which passes through both support element 38 and the other embodiment of profiled rail 34. After screw 24 has been loosened, second profiled rail 18 may be moved into the position indicated in dotted lines, where it may also be secured again to first profiled rail 2 after screw 24 has been tightened.

Figure 10:
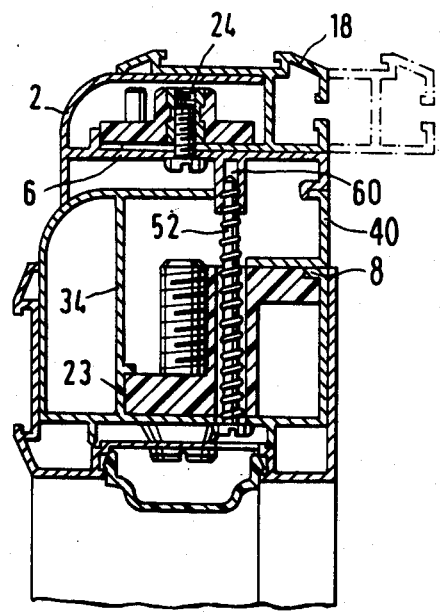
FIG. 10 is a cross-section of an embodiment comprising profiled rails arranged at right-angles to each other.

FIG. 10 illustrates embodiment in which first profiled rail 2 is secured to the other profiled rail 34 by means of attachment screw 52. Web 6 of the said first profiled rail comprises a screw channel 60 for attachment screw 52. During assembly, second profiled rail 18 is first moved to the desired position and screw 24 is then tightened, whereupon the other profiled rail 34 is secured to profiled rail 2 by means of attachment screw 52.

Figure 11:
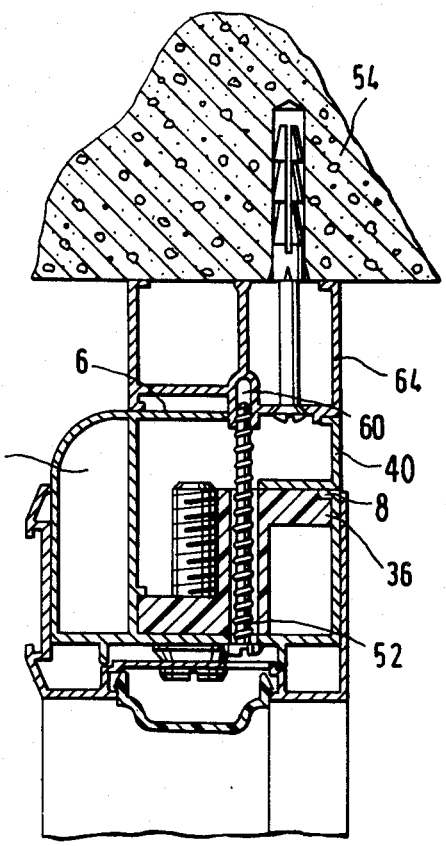
FIG. 11 is a cross-section of an embodiment corresponding to FIG. 6 also comprising a widening section.

According to FIG. 11, profiled rail 34 is secured to wall 54 by a widening profile 64. The latter, in turn, comprises a screw channel 60 for attachment screw 52 which passes through profiled rail 34 and also through support element 36. It should be pointed out that, according to the invention, the length of leg 8 is such that attachment screw 52 can engage unimpededly in screw channel 60. Alternatively, leg 8 could, according to the invention, also be provided with an appropriate opening therefor.

The above embodiments relate to profiled rails for a shower partition, but this is not intended to restrict the invention. It is expressly emphasized that, according to the invention, the said profiled rails are provided, in at least two areas, with clamping elements, screws and relevant slots and holes, for the purpose of ensuring an overall reliable and functional joint between them. According to the invention, additional clamping elements, with screws and so forth, may be distributed over the length of the said profiled rails.

I claim:
1. A coupling assembly comprising:
   a multi-walled first elongated profiled hollow rail having a longitudinal axis, an inner space running along said axis and an opening through at least a first wall of said first rail, said opening extending essentially over the full length of said first rail and giving access to said inner space;

a clamping element having a bearing surface and being constructed of a size and shape to allow passage thereof across said opening, said clamping element being formed with a threaded hole;

means mounting said clamping element in said inner space for non-rotational but translational movement relative to said axis;

means defining a fixed clamping surface in said inner space, said clamping surface and said bearing surface defining therebetween a clamping gap;

said first profiled rail having a second wall formed with a hole therethrough facing said threaded hole of said clamping member;

a screw extending freely through said second wall hole and screwed into said threaded hole of said clamping member so that rotation of said screw causes said translational movement of said clamping member and variation in the width of said clamping gap; and a second profiled rail having a leg inserted into said clamping gap, whereby rotation of said clamping screw in one direction increases the clamping pressure on said leg to secure said profiled rails together and rotation of said screw in reverse direction loosens said pressure and frees said profiled rails from one another so as to allow relative spatial adjustment of said rails; and wherein said opening is formed at a corner of said first rail defined by imaginary extensions of said first wall and of a third wall of said first rail, and wherein said means defining said clamping surface is an inwardly turned web at the edge of said third wall, said web being parallel with said first wall.

2. A coupling assembly according to claim 1, wherein said leg of said second profiled rail is formed with a slot running approximately at right angles to said longitudinal axis, said screw and said clamping element passing through said slot.

3. A coupling assembly comprising:
a multi-walled first elongated profiled hollow rail having a longitudinal axis, an inner space running along said axis and an opening through at least a first wall of said first rail, said opening extending essentially over the full length of said first rail and giving access to said inner space;

a clamping element having a bearing surface and being constructed of a size and shape to allow passage thereof across said opening, said clamping element being formed with a threaded hole;

means mounting said clamping element in said inner space for non-rotational but translational movement relative to said axis;

means defining a fixed clamping surface in said inner space, said clamping surface and said bearing surface defining therebetween a clamping gap;

said first profiled rail having a second wall formed with a hole therethrough facing said threaded hole of said clamping member;

a screw extending freely through said second wall hole and screwed into said threaded hole of said clamping member so that rotation of said screw causes said translational movement of said clamping member and variation in the width of said clamping gap; and a second profiled rail having a leg inserted into said clamping gap, whereby rotation of said clamping screw in one direction increases the clamping pressure on said leg to secure said profiled rails together and rotation of said screw in reverse direction loosens said pressure and frees said profiled rails from one another so as to allow relative spatial adjustment of said rails; and wherein said means defining said clamping surface is a web of said first rail and said clamping element comprises an extension facing said web, said extension passing through a support element and containing said threaded hole.

4. A coupling assembly comprising:
a multi-walled first elongated profiled hollow rail having a longitudinal axis, an inner space running along said axis and an opening through at least a first wall of said first rail, said opening extending essentially over the full length of said first rail and giving access to said inner space;

a clamping element having a bearing surface and being constructed of a size and shape to allow passage thereof across said opening, said clamping element being formed with a threaded hole;

means mounting said clamping element in said inner space for non-rotational but translational movement relative to said axis;

means defining a fixed clamping surface in said inner space, said clamping surface and said bearing surface defining therebetween a clamping gap;

said first profiled rail having a second wall formed with a hole therethrough facing said threaded hole of said clamping member;

a screw extending freely through said second wall hole and screwed into said threaded hole of said clamping member so that rotation of said screw causes said translational movement of said clamping member and variation in the width of said clamping gap; and a second profiled rail having a leg inserted into said clamping gap, whereby rotation of said clamping screw in one direction increases the clamping pressure on said leg to secure said profiled rails together and rotation of said screw in reverse direction loosens said pressure and frees said profiled rails from one another so as to allow relative spatial adjustment of said rails;

said means defining said clamping surface comprising a support element having a threaded hole and an adjusting screw threaded into said threaded hole for fastening of said assembly to a frame section.

5. A coupling assembly comprising:
a multi-walled first elongated profiled hollow rail having a longitudinal axis, an inner space running along said axis and an opening through at least a first wall of said first rail, said opening extending essentially over the full length of said first rail and giving access to said inner space;

a clamping element having a bearing surface and being constructed of a size and shape to allow passage thereof across said opening, said clamping element being formed with a threaded hole;

means mounting said clamping element in said inner space for non-rotational but translational movement relative to said axis;

means defining a fixed clamping surface in said inner space, said clamping surface and said bearing surface defining therebetween a clamping gap;

said first profiled rail having a second wall formed with a hole therethrough facing said threaded hole of said clamping member;

a screw extending freely through said wall hole and screwed into said threaded hole of said clamping member so that rotation of said screw causes said translational movement of said clamping member and variation in the width of said clamping gap; and a second profiled rail having a leg inserted into said clamping gap, whereby rotation of said clamping screw in one direction increases the clamping pressure on said leg to secure said profiled rails together and rotation of said screw in reverse direction loosens said pressure and frees said profiled rails from one another so as to allow relative spatial adjustment of said rails;

wherein said second profiled rail comprises two adjacent legs which bear against inner and outer surfaces of said first profiled rail, and two webs of said first profiled rail comprise, between the outer and inner surfaces upon which the legs bear, a distance which is substantially equal to that between the corresponding surfaces of the adjacent legs of the second profiled rail.

6. A coupling assembly comprising:

a multi-walled first elongated profiled hollow rail having a longitudinal axis, an inner space running along said axis and an opening through at least a first wall of said first rail, said opening extending essentially over the full length of said first rail and giving access to said inner space;

a clamping element having a bearing surface and being constructed of a size and shape to allow passage thereof across said opening, said clamping element being formed with a threaded hole;

means mounting said clamping element in said inner space for non-rotational but translational movement relative to said axis;

means defining a fixed clamping surface in said inner space, said clamping surface and said bearing surface defining therebetween a clamping gap;

said first profiled rail having a second wall formed with a hole therethrough facing said threaded hole of said clamping member;

a screw extending freely through said second wall hole and screwed into said threaded hole of said clamping member so that rotation of said screw causes said translational movement of said clamping member and variation in the width of said clamping gap; and a second profiled rail having a leg inserted into said clamping gap, whereby rotation of said clamping screw in one direction increases the clamping pressure on said leg to secure said profiled rails together and rotation of said screw in reverse direction loosens said pressure and frees said profiled rails from one another so as to allow relative spatial adjustment of said rails;

said clamping element mounting means comprising a support element and means for non-rotatably mounting said support element in said space, said support having a through bore of non-circular cross-section and said clamping element having an extension of like non-circular cross-section, said extension being provided with said threaded hole and wherein said clamping surface is formed by said support element.

7. A coupling assembly according to claim 6, wherein said support element comprises a transverse hole through which a mounting screw may be passed.

* * * * *